3,422,036
CATALYSIS OF THE ACTIVE HYDROGEN-ISOCYANATE REACTION
Konrad Ellegast, Leichlingen, and Gerd Reinecke, Leverkusen, Germany, assignors to Farbenfabriken Bayer Aktiengesellschaft, Leverkusen, Germany, a German corporation
No Drawing. Filed Apr. 19, 1965, Ser. No. 449,299
Claims priority, application Germany, Apr. 21, 1964, F 42,678
U.S. Cl. 260—2.5    6 Claims
Int. Cl. C08g 22/40

ABSTRACT OF THE DISCLOSURE

The active hydrogen-isocyanate polyaddition reaction is conducted in the presence of a catalytic amount of alkali metal compound that dissociates in aqueous solution to give a pH range of from about 3 to 6.

---

This invention relates to the preparation of polyaddition products prepared by reacting organic polyisocyanates with organic compounds containing active hydrogen atoms and more particularly, to the catalysis of the active hydrogen-isocyanate reaction.

Tertiary amines and metal compounds have long been used for catalyzing isocyanate reactions. It is known that the more basic the catalysts, the stronger their action. With alkali metal compounds, those which contain a weak acid as anion and accordingly have a basic reaction are usually preferred, such as sodium acetate, sodium propionate, potassium oleate or sodium phenoxide. It has also long been known that these activators can only be used in small quantities and preferentially catalyze the trimerization of isocyanate groups; this leads to excessively cross-linked products with low structural strength.

Acids, especially polycarboxylic acids, have hitherto been used as retarding agents with the alkali metal compounds in order to weaken the too strong activity of the metal catalysts. Inorganic acids have also been employed as retarding agents. Accordingly, the opinion has hitherto frequently been expressed that basic compounds accelerate the isocyanate reaction and acidic compounds retard the reaction.

It is therefore an object of this invention to provide an improved method of conducting the active hydrogen-isocyanate polyaddition reaction. It is another object of this invention to catalyze the reaction of active hydrogen containing compounds with isocyanates. It is still another object of this invention to provide a method for conducting the active hydrogen-isocyanate polyaddition reaction which results in products having improved physical and chemical properties. It is another object of this invention to provide polyurethanes having improved hot air and hydrolysis resistance. It is a still further object of this invention to provide a method for catalyzing the active hydrogen-isocyanate polyaddition reaction which minimizes the formation of trimerization products.

The foregoing objects and others which will become apparent from the following description are accomplished in accordance with the invention generally speaking by providing polyurethane plastics prepared by reacting organic compounds containing active hydrogen atoms as determined by the Zerewitinoff method which are reactive with NCO groups with an organic polyisocyanate in the presence of alkali metal compounds which dissociate in aqueous solution to give an acidic pH range of from about 3 to about 6. While the invention is applicable to the action of any active hydrogen containing compound with any organic polyisocyanate, it is particularly suitable in the preparation of polyurethanes wherein the organic compound containing active hydrogen atoms has a molecular weight of at least about 800. The invention is also particularly applicable wherein a mixture of active hydrogen containing compounds is used, one having a molecular weight of at least about 800 and the other having a molecular weight of less than about 500. Both cellular and noncellular polyurethanes can be prepared using the particular catalyst in accordance with this invention. When cellular polyurethanes are being prepared, it is sometimes desirable to use water as a blowing agent and chain-extending agent.

The catalysts used in accordance with this invention have the advantage that they are colorless, odorless and are not present in the final product. By comparison with basic alkali metal compounds which are known in the art, the weakly acidic compounds employed herein catalyze the polyaddition reaction greater than that trimerization of the NCO groups and this leads to a more rapid consolidation into products having a higher molecular weight and thus, improved physical and chemical properties.

Any suitable alkali metal compound which is wholly or partially soluble in the reaction medium and which dissociates in aqueous solution to give a pH of from about 3 to about 6 may be used in accordance with this invention such as, for example, alkali metal phenoxides in which the phenol nucleus contains acid by acting substituents such as sodium-p-nitro-2,6-dichloro phenoxide, sodium-2,4-dinitro phenoxide, sodium chloroacetate, sodium dichloroacetate, sodium-α-chloropropionate, sodium malonate, sodium cyanide and the sodium salts of 4-chlorobenzene sulphonic acid, 4-nitrotoluene sulphonic acid, 2-chloro ethane sulphonic acid, methane sulphonic acid and sulphanilic acid and the like. The corresponding potassium and lithium compounds can be used in place of the sodium compounds mentioned above. It is to be understood that in some instances, the pure compounds set forth will not give a pH range within about 3 to about 6, and in some cases, will even be basic. However, when such is the case, the pH must be adjusted by the addition of a suitable acid for example, to result in a pH within the specified range. For example, the reaction product of sodium hydroxide with chloracetic acid when prepared from equivalent amounts of the reactants, will be slightly basic rather than acidic. This is true because chloracetic acid has an ionization constant of $1.4 \times 10^{-3}$. In order to use this compound as a catalyst in accordance with this invention, the pH must be adjusted to within the range of 3 to 6. Any suitable manner of adjusting the pH can be used. The particular compound having the pH set forth should be used in a catalytic amount. Preferably, the particular catalyst should be used in the range of from about 0.002 mmol/percent to 0.2 mmol/percent. That means that for 100 parts by weight of reaction mixture between about 0.002 millimol and about 0.2 millimol should be employed.

The method of this invention of catalyzing the active hydrogen polyurethane reaction relates to all types of active hydrogen compounds and polyisocyanates. Any organic compound containing active hydrogen atoms as determined by the Zerewitinoff method and which are reactive with NCO groups may be used in the process of this invention such as, for example, monomeric compounds such as polyhydric alcohol including ethylene glycol, propylene glycol, 1,4-butanediol, 1,3-butanediol, 1,5-pentanediol and the isomers thereof, 1,6-hexanediol and the isomers thereof, xylylene glycol, diethylene glycol, thiodiglycol, p-phenylene-di-β-hydroxy-ethyl ether, trimethylol propane, glycerol, sorbitol, tris(hydroxyethoxy)benzene, diethanolamine, triethanol amine, dipropanol amine, tripropanol amine and the like; organic polyamines such as, for example, ethylene diamine, propylene diamine, 1,4-butylene diamine, 1,3-butylene diamine, hexamethylene diamine, methylene-bis(o-chloro aniline), tolylene diamine, 4,4'-diaminodiphenylmethane xylylene diamine, 2,4,6-tolylene triamine and the like; amino alcohols such as, for example, amino ethyl alcohol, amino propyl alcohol, amino butyl alcohol and the like; polycarboxylic acids such as, for example, those mentioned hereinafter with relation to the preparation of hydroxyl polyesters; amino acids such as, for example, amino acetic acid, amino propionic acid, amino isovaleric acid, amino valeric acid, amino isocaproic acid, amino caproic acid, amino hydroxyl butyric acid, amino succinic acid and the like; polymeric organic compounds containing active hydrogen atoms in the molecule such as, for example, hydroxyl polyesters, polyesteramides, polyhydric polyalkylene ethers, polyhydric polythioethers, polyacetals and the like.

Any suitable hydroxyl polyester may be used such as, for example, the reaction product of a polycarboxylic acid and a polyhydric alcohol. Any suitable polycarboxylic acid may be used in the preparation of polyesters such as, for example, adipic acid, succinic acid, suberic acid, sebacic acid, oxalic acid, methyladipic acid, glutaric acid, pimelic acid, azelaic acid, phthalic acid, terephthalic acid, isophthalic acid, thiodiglycollic acid, thiodipropionic acid, maleic acid, fumaric acid, citraconic acid, itaconic acid, trimellitic acid, pyromellitic acid, 1,3,5-benzene tricarboxylic acid and the like. Any suitable polyhydric alcohol may be used in the reaction with the polycarboxylic acid to form a polyester such as, for example, ethylene glycol, propylene glycol, hexanediol, bis(hydroxy methyl cyclohexane), 1,4-butanediol, diethylene glycol, polyethylene glycol, 2,2-dimethyl propylene glycol, xylylene glycol, trimethylol propane, glycerine, castor oil and the like.

Any suitable polyhydric polyalkylene ether may be used such as, for example, the condensation product of an alkylene oxide with a compound containing active hydrogen atoms such as, for example, water, ethylene glycol, propylene glycol, butylene glycol, amylene glycol, trimethylol propane, 1,2,6-hexanetriol, bis-phenol A, hydroquinone, pyrocatechol, pyrogallol, ammonia, aminoethanol, diethanolamine, triethanolamine and the like. Any suitable alkylene oxide condensate may also be used such as, for example, the condensates of ethylene oxide, propylene oxide, butylene oxide, amylene oxide, styrene oxide and mixtures thereof. The polyalkylene ethers prepared from tetrahydrofuran may be used, such as, polytetramethylene ether glycols. The polyhydric polyalkylene ethers may be prepared by any known process such as, for example, the process described by Wurtz in 1859 and in the Encyclopedia of Chemical Technology, volume 7, pages 257–262, published by Interscience Publishers in 1951 or in U.S. Patent 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propyl sulfide, 4,4'-dihydroxy butyl sulfide, 1,4-(β-hydroxy ethyl)phenylene dithioether and the like.

Any suitable polyesteramide may be used such as, for example, the reaction product of poly- or diamine and/or amino alcohol with a carboxylic acid. Any suitable amine such as, for example, ethylene diamine, propylene diamine, ethanolamine, 2,4-toluene diamine, p-phenylene diamine and the like may be used in the preparation of the polyesteramide. Any suitable polycarboxylic acid may be used such as, for example, those more particularly disclosed before for the preparation of hydroxyl polyesters. Further, a mixture of a glycol and an amino alcohol or polyamine may be used. Any of the glycols mentioned for the preparation of the polyesters may be used.

Any suitable polyacetal may be used such as, for example, the reaction product of an aldehyde and a polyhydric alcohol. Any suitable aldehyde may be used in the preparation of the polyacetal such as, for example, formaldehyde, paraldehyde, butyraldehyde and the like. Any of the polyhydric alcohols mentioned above in the preparation of the hydroxyl polyesters may be used. Any of the polyacetals set forth in U.S. Patent 2,961,428 may be used.

Any suitable organic polyisocyanate may be used in the process of this invention such as, for example, aliphatic, aromatic, alicyclic and heterocyclic polyisocyanates including such as, for example, ethylene diisocyanate, ethylidene diisocyanate, propylene diisocyanate, butylene diisocyanate, cyclopentylene-1,3-diisocyanate, cyclohexylene-1,4 - diisocyanate, cyclohexylene-1,2 - diisocyanate, 2,4-tolylene diisocyanate, 2,6-tolylene diisocyanate, 4,4'-diphenylmethane diisocyanate, 2,2-diphenylpropane-4,4'-diisocyanate, 3,3'-dimethyldiphenylmethane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulfone-4,4'-diisocyanate, dichlorohexamethylene diisocyanate, tetramethylene diisocyanate, pentamethylene diisocyanate, hexamethylene diisocyanate, 1-chlorobenzene-2,4-diisocyanate, furfurylidene diisocyanate, 2,7-diisocyanato-dibenzfuran, 2,4,6-tolylene triisocyanate, 4,4',4''-triphenylmethane triisocyanate, 4,4',4'',4'''-tetraphenylmethane tetraisocyanate and the like. Also suitable as the organic polyisocyanate are the reaction products containing at least two —NCO groups per molecule of any of the above-mentioned monomeric polyisocyanates with any of the previously mentioned active hydrogen containing compounds; higher molecular weight products containing at least two —NCO groups per molecule prepared by the polymerization of polyisocyanate, including dimers and trimers of these compounds such as, for example, N,N'-bis(4'-methyl-3'-isocyanato phenyl)uretdione; the polymer prepared by polymerizing 3 mols of 2,4-tolylene diisocyanate and the like; polycarbodiimides containing at least two —NCO groups per molecule prepared from monomeric polyisocyanates and the like. It is preferred, however, that the aromatic diisocyanates to be used.

The production of the homogeneous or cellular polyurethane plastics is in other respects carried out in a manner known per se, whether the components are simultaneously combined in a one-stage process, whether the polyhydroxy compound is mixed with the chain extender and the polyisocyanate is added, or whether initially a prepolymer is prepared from the polyhydroxy compound with an excess of polyisocyanate and the chain-extender is added to this adduct in a quantity insufficient for complete reaction with the residual NCO groups. The reaction mixtures which are obtained can be processed by casting, depending upon the choice of the components, in which case the cast product is cured in molds. They can, however, also be sprayed or subjected to thermoplastic processing. When the reaction as known per se is carried out in suitable manner, cellular plastics can be obtained by the addition of water which the chain-extender and/or by the addition of blowing agents such as, for example, halogenated hydrocarbons such as, methylene chloride, difluorodichloroethane, trifluorochloroethane, trichlorofluoroethane and the like; hydrocarbons such as, propane, butane, pentane, hexane, heptane and the like.

In the preparation of nonporous polyurethanes, for example, it is desirable to use an organic compound containing active hydrogen atoms and having a molecular weight of at least about 800 with a chain-extending agent having a molecular weight less than 500 in reaction with the organic polyisocyanate. Any of the polymeric compounds containing active hydrogen atoms set forth above and having a molecular weight of at least about 800 may be used in this embodiment of the invention. Any of the monomeric compounds containing active hydrogen atoms, set forth above, can be used as the chain-extending agent.

The catalysts can be used both in a single-stage process and in a multi-stage process. In single-stage processes, the activator is advantageously dissolved in the polyhydroxy compound, whereas the multi-stage processes, it is preferred to add the activator last of all.

The catalysts to be used according to the invention also provide technical processing advantages. Whereas basic catalysts apart from promoting the lengthening reaction also promote cross-linking in the liquid phase and thus undesirably raise the viscosity of casting solutions, acidly activated mixtures remain liquid and can be cast much more easily into bubble-free molded elements. The casting time and the time for removal from the mold of such mixtures can be controlled within wider limits than hitherto. With two-stage processes, the new activators permit the first reaction stage (the reaction of the polyhydroxy compound with excess polyisocyanate) to be carried out very slowly in order thereby to increase the stability of the initial products, and in the second stage, the required processing times can be adjusted with the activated chain-extenders. In the presence of the catalysts, slowly reacting diisocyanates can be processed at relatively low temperatures to form good products, which is often desired on physiological grounds, but also has advantages insofar as the compositions processed at lower temperatures show less shrinkage. Both with continuous and with discontinuous casting processes, it is possible to produce a higher capacity with the activators, because the mold-release time can be made shorter than that formerly required.

The invention is further illustrated but not limited by the following examples in which parts are by weight unless otherwise specified.

EXAMPLE 1

About 500 parts of an anhydrous polyester of adipic acid and ethylene glycol (OH number 56, acid number below 2) are reacted with about 90 parts of 1,5-naphthylene diisocyanate for about 10 minutes at about 125° C. During this time, the mixture is stirred under vacuum in order to remove all gases. Thereafter, a N/100 solution of sodium-p-nitro-2,6-dichlorophenoxide in butane-1,4-diol is incorporated by stirring and the mixture is poured into molds. The casting time is about 4 minutes and the objects can be removed from the mold after about 10 minutes. The product (A) thus obtained shows the following properties by comparison with an elastomer (B) produced without the activator:

|  | Test specification | A | B |
|---|---|---|---|
| Shore hardness A | DIN 53505 | 83 | 85 |
| Tensile strength kp./cm.² | DIN 53504 | 335 | 277 |
| Elongation at break, percent | DIN 53504 | 753 | 702 |
| Permanent elongation, percent | DIN 53504 | 12 | 17 |
| Elasticity | DIN 53512 | 47 | 40 |
| Structural strength kp./cm |  | 67 | 53 |
| After storage in hot air at 110° C.: |  |  |  |
| 1 week tensile strength, kp./cm.² |  | 306 | 209 |
| Elongation at break, percent |  | 743 | 673 |
| Permanent elongation, percent |  | 19 | 59 |
| 2 weeks tensile strength, kp./cm.² |  | 270 | 178 |
| Elongation at break, percent |  | 780 | 775 |
| Permanent elongation, percent |  | 20 | 59 |
| 3 weeks tensile strength, kp./cm.² |  | 275 | 173 |
| Elongation at break, percent |  | 800 | 735 |
| Permanent elongation, percent |  | 32 | 79 |
| After hydrolysis aging at 70° C. and 95% humidity: |  |  |  |
| 2 weeks tensile strength, kp./cm.² |  | 284 | 95 |
| Elongation at break, percent |  | 800 | 658 |
| Permanent elongation, percent |  | 21 | 100 |
| 4 weeks tensile strength, kp./cm.² |  | 193 | (¹) |
| Elongation at break, percent |  | 795 |  |
| Permanent elongation, percent |  | 57 |  |

¹ Specimens destroyed.

EXAMPLE 2

About 500 parts of an anhydrous polyester of adipic acid, ethylene glycol and butane-1,4-diol (OH number 56, acid number below 2) are mixed with about 31 parts of hydroquinone dihydroxyethyl ether and about 0.12 part of sodium monochloracetate. After heating to about 130° C., about 73 parts of hexamethylene diisocyanate (at room temperature) are quickly incorporated by stirring and the casting mixture is cast into plates. These can be removed after about 10 minutes and, after another 20 minutes, can be granulated in a cutting mill. The granulated material obtained in this way can be extruded in extrusion machines into molded articles (A) and by comparison with activator-free material (B) which was only granulated after subsequent heating for 2 hours, show the following physical properties:

| Product | Test specification | A | B |
|---|---|---|---|
| Shore hardness A | DIN 53505 | 75 | 73 |
| Tensile strength kp./cm.² | DIN 53504 | 155 | 110 |
| Elongation at break, percent | DIN 53504 | 880 | 760 |
| Permanent elongation, percent | DIN 53504 | 40 | 73 |
| Elasticity, percent | DIN 53512 | 55 | 52 |
| Structural strength, kp./cm | | 36 | 29 |

EXAMPLE 3

About 1000 parts of a polyester of adipic acid and ethylene glycol (OH number 56; acid number below 2) are reacted at about 125° C. with about 180 parts of 1,5-naphthylene diisocyanate. After the reaction period, which lasts about 8 minutes, about 6 parts of an aqueous N/20 solution of potassium monochloracetate are incorporated by stirring and the foaming mass is poured into waxed molds. The formed material is consolidated in a heating chamber for about 20 minutes at about 110° C. and is thereafter pressed on a cooled roller into a sheet, which can be pressed in conventional vulcanizing presses at about 150° C. to form homogeneous molded articles.

The elastomer (A) prepared in this way has the following physical properties by comparison with a product (B) cross-linked without catalyst:

| Product | Test specification | A | B |
|---|---|---|---|
| Shore hardness A | DIN 53505 | 73 | 72 |
| Tensile strength, kp./cm.² | DIN 53504 | 330 | 300 |
| Elongation at break, percent | DIN 53504 | 770 | 650 |
| Permanent elongation, percent | DIN 53504 | 20 | 30 |
| Elasticity, percent | DIN 53512 | 56 | 54 |
| Resistance to further tearing kp./cm. (Graves) | | 27 | 65 |

It is to be understood that while the examples set forth relate to the preparation of specific types of polyurethane polymers, the compounds used therein and named throughout the specification can be used to catalyze the reaction between any compound containing active hydrogen atoms and any organic polyisocyanates. Further, any of the active hydrogen compounds can be substituted into the examples for those specifically set forth therein. This is equally true with regard to the substitution of any other organic polyisocyanates for those used in the examples.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

We claim:
1. A method of preparing polyaddition products which comprises reacting an organic compound containing active hydrogen atoms as determined by the Zerewitinoff method and which are reactive with NCO groups with an organic polyisocyanate in the presence of a catalytic amount of an alkali metal compound that dissociates in aqueous solution to give a pH of from about 3 to about 6.

2. A process for preparing polyurethane polymers which comprises reacting an organic compound containing active hydrogen atoms as determined by the Zerewitinoff method and that are reactive with NCO groups, said compound having a molecular weight of at least about 800 with an organic polyisocyanate in the presence of a catalytic amount of an alkali metal compound that dissociates in aqueous solution to give a pH of from about 3 to about 6.

3. The process of preparing polyurethane polymers which comprises reacting an organic compound containing active hydrogen atoms as determined by the Zerewitinoff method and that are reactive with NCO groups, said compound having a molecular weight of at least about 800 and a chain-extending agent having active hydrogen atoms that are reactive with NCO groups and a molecular weight of less than about 500 with an organic polyisocyanate in the presence of an alkali metal compound that dissociates in aqueous solution to give a pH of from about 3 to about 6.

4. The process of claim 3 wherein reaction is performed in the presence of sodium monochloro acetate.

5. The process for the preparation of cellular polyurethane plastics which comprises reacting an organic compound containing active hydrogen atoms as determined by the Zerewitinoff method and that are reactive with NCO groups with an organic polyisocyanate in the presence of a blowing agent and a catalytic amount of an alkali metal compound that dissociates in aqueous solution to give a pH of from about 3 to about 6.

6. The process of claim 1 wherein the alkali compound is selected from the group consisting of sodium-p-nitro-2,6-dichloro phenoxide, sodium 2,4-dinitro phenoxide, sodium chloroacetate, sodium dichloroacetate, sodium-a-chloropropionate, lithium-p-nitro-2,6 - dichlorophenoxide, lithium 2,4-dinitro phenoxide, lithium chloroacetate, lithium dichloroacetate, lithium-a-chloropropionate, potassium-p-nitro 2,6-dichlorophenoxide, potassium 2,4-dinitro phenoxide, potassium chloroacetate, potassium dichloroacetate and potassium-a-chloropropionate.

References Cited

UNITED STATES PATENTS

| 2,634,244 | 4/1953 | Simon et al. | 260—2.5 |
| 2,772,245 | 11/1956 | Simon et al. | 260—2.5 |
| 3,028,345 | 4/1962 | Johnson | 260—2.5 |
| 3,108,975 | 10/1963 | Lambert et al. | 260—2.5 |
| 3,112,320 | 11/1963 | Farkas | 260—268 |

FOREIGN PATENTS

| 770,526 | 1/1954 | Great Britain. |
| 631,047 | 11/1961 | Canada. |

OTHER REFERENCES

Journal of Applied Polymer Science, vol. 4, pp. 207–211 (1960), Britain et al.

DONALD E. CZAJA, Primary Examiner.

M. B. FEIN, Assistant Examiner.

U.S. Cl. X.R.

260—75, 77.5